United States Patent
Bertolino et al.

(10) Patent No.: US 7,954,223 B2
(45) Date of Patent: Jun. 7, 2011

(54) METHOD FOR PRODUCING A SEALED ASSEMBLY

(75) Inventors: Remi Bertolino, Chassieu (FR); Christian Tournier, Badinieres (FR)

(73) Assignee: Valeo Equipements Electriques Moteur, Creteil (FR)

( * ) Notice: Subject to any disclaimer, the term of this patent is extended or adjusted under 35 U.S.C. 154(b) by 540 days.

(21) Appl. No.: 11/912,927

(22) PCT Filed: Apr. 13, 2006

(86) PCT No.: PCT/FR2006/050349
§ 371 (c)(1),
(2), (4) Date: Oct. 29, 2007

(87) PCT Pub. No.: WO2006/123076
PCT Pub. Date: Nov. 23, 2006

(65) Prior Publication Data
US 2008/0191421 A1 Aug. 14, 2008

(30) Foreign Application Priority Data
May 19, 2005 (FR) .................................... 05 05025

(51) Int. Cl.
*B21D 39/00* (2006.01)
*B23P 11/00* (2006.01)

(52) U.S. Cl. .................... 29/505; 29/525.01; 29/525.11; 403/282

(58) Field of Classification Search ..................... 29/505, 29/525.01, 525.11; 403/274, 282
See application file for complete search history.

(56) References Cited

U.S. PATENT DOCUMENTS

| 3,180,203 | A | * | 4/1965 | Vaughn | 411/34 |
| 3,200,275 | A | * | 8/1965 | Lindgren | 310/90 |
| 3,849,964 | A | | 11/1974 | Briles | |
| 4,056,878 | A | * | 11/1977 | Woodley | 29/525.11 |
| 5,256,019 | A | * | 10/1993 | Phillips, II | 411/187 |
| 5,878,488 | A | | 3/1999 | Muirhead | |
| 6,053,653 | A | * | 4/2000 | Tanaka et al. | 403/282 |
| 6,641,229 | B1 | * | 11/2003 | Kosak | 301/132 |
| 6,712,573 | B1 | * | 3/2004 | Huber | 411/71 |
| 7,375,606 | B2 | | 5/2008 | Talon et al. | |
| 7,520,741 | B2 | * | 4/2009 | Wilson et al. | 425/195 |
| 2007/0171583 | A1 | | 7/2007 | Talon et al. | |

FOREIGN PATENT DOCUMENTS

| DE | 4342461 A1 | 6/1995 |
| FR | 1484141 A | 6/1967 |
| FR | 2241015 A | 3/1975 |
| FR | 2509823 A | 1/1983 |
| WO | 2004088126 A | 10/2004 |

* cited by examiner

*Primary Examiner* — Jermie E Cozart
(74) *Attorney, Agent, or Firm* — Jacox, Meckstroth & Jenkins

(57) ABSTRACT

A method for producing a sealing arrangement between an opening of the support, bore and a screw which comprises a head connected to a body and is provided with a threaded section for interacting with the hole of a part to be assembled with a support whose mechanical strength is lower than that of the screw. The invention is characterized in that, starting from an enlarged opening, the inventive method consists in engaging the screw into the bore in such a way that the head thereof is brought into contact with the opening, in screwing the screw into the hole of the part to be assembled in such a way that a pressure applied by the head sealingly presses the opening against the part of the under-head surface of the screw by removing a part of material of the support.

6 Claims, 3 Drawing Sheets

METHOD FOR PRODUCING A SEALED ASSEMBLY

BACKGROUND OF THE INVENTION

1. Field of the Invention

The present invention concerns the sealing between the opening of a bore and a screw and more precisely a method and assembly for providing a seal between the screw and the opening of the bore on which the head of the screw comes to abut.

The invention finds applications in particular in the field of the automobile industry and more precisely for assembling a contactor on a starter support.

2. Description of the Related Art

The method of the invention concerns the production of a seal between the opening of a bore belonging to a support and a screw comprising a head connected to a body provided with a threaded part intended to cooperate with a hole in a piece to be assembled with the support, the support having a lower mechanical strength than the screw.

The document FR 2 509 823 discloses a method for producing a seal between the opening of a bore in a cap molded from a thermoplastic material and a terminal.

Means under the head of the terminal are provided to act on the opening of the bore so that the clamping of the terminal with respect to the cap gives rise to the deformation of the opening by causing flow of the plastic material so that it constitutes a rim that comes to be gripped against the smooth periphery of the body of the terminal.

The means carried by the terminal to deform the opening of the bore are produced in the form of a bevel, constituting the connection between the head and the body of the terminal, this bevel coming to bear against the sharp-angled edge of the bore of the housing.

In a variant, it is the opening of the bore that comprises an external peripheral bead that is pushed back by the flat underside of the head of the terminal with a view to constituting the rim.

This document concerns particularly the sealing of the terminals of the contactor of an electric starter for an internal combustion engine.

The method disclosed in the document FR 2 509 823 applies to a terminal having on the periphery of its body a smooth surface in order to enable the rim to be clamped against this periphery. It is therefore necessary to develop a specific manufacturing method for producing this smooth surface, which may be expensive.

In addition, the method described concerns only a cap molded from thermoplastic material.

Finally, the sealing takes place solely between the rim and the periphery of the smooth part of the terminal.

SUMMARY OF THE INVENTION

Thus a technical problem to be resolved by the object of the present invention is to propose a method and assembly for producing a seal between the opening of a bore belonging to a support and a screw that make it possible:

to avoid the use of an additional piece providing the seal,
to produce a seal between two surfaces belonging to pieces that may have been metal,
to produce a seal between surfaces not necessarily requiring a smooth surface finish,
to produce a seal between the opening of the bore and the screw, this screw being able to resist high mechanical, vibratory and thermal stresses.
to produce a seal in a simple and economical manner.

One solution to the technical problem posed is, according to a first object of the present invention, a method characterized in that, starting from an enlarged opening, the method comprises the following steps:

engaging the screw in the bore so that the head comes into contact with the opening,
screwing the screw into the hole in the piece to be assembled so that the pressure exerted by the head causes a sealed fitting of the opening on part of the surface under the head of the screw by pushing back part of the material belonging to the support.

Thus it is not necessary to use an additional piece for producing the seal, such as a seal of the O-ring type. The production of a countersink to recess this seal in the support is also avoided. In addition, the method does not require the use of a screw specially treated with regard to its surface finish. Finally, the opening of the bore receiving the head of the screw may issue directly from molding, in the case where the support is molded, not having to pass through an additional machining step to improve its surface finish.

According to non-limitative preferential embodiments, the method that is the object of the invention has the additional characteristics, taken in isolation or in combination, set out below.

Pushing back material creates a rim.

The opening of the bore is splayed and the under-head surface is of revolution.

The opening is frustoconical in shape.

The under-head surface is flat.

The support is made from aluminum and the screw is made from steel.

According to a second object of the invention, a sealed assembly obtained by the first object of the invention is characterized in that the impression left by the screw head on the opening comprises at least:

a first surface, circumferential around the axis of revolution of the screw,
a second surface, belonging to a rim, circumferential around the axis of revolution of the screw and extending the first surface.

These two surfaces thus participate actively in the sealed fitting of the opening on part of the under-head surface of the screw.

According to an additional characteristic, the assembly is effected between a front starter support and at least one screw for fixing a contactor to this support.

According to another characteristic, the assembly is effected between a rear starter bearing and at least one screw for fixing a contactor to this bearing.

These and other objects and advantages of the invention will be apparent from the following description, the accompanying drawings and the appended claims.

DETAILED DESCRIPTION OF THE ILLUSTRATIVE EMBODIMENT

Figure 1:
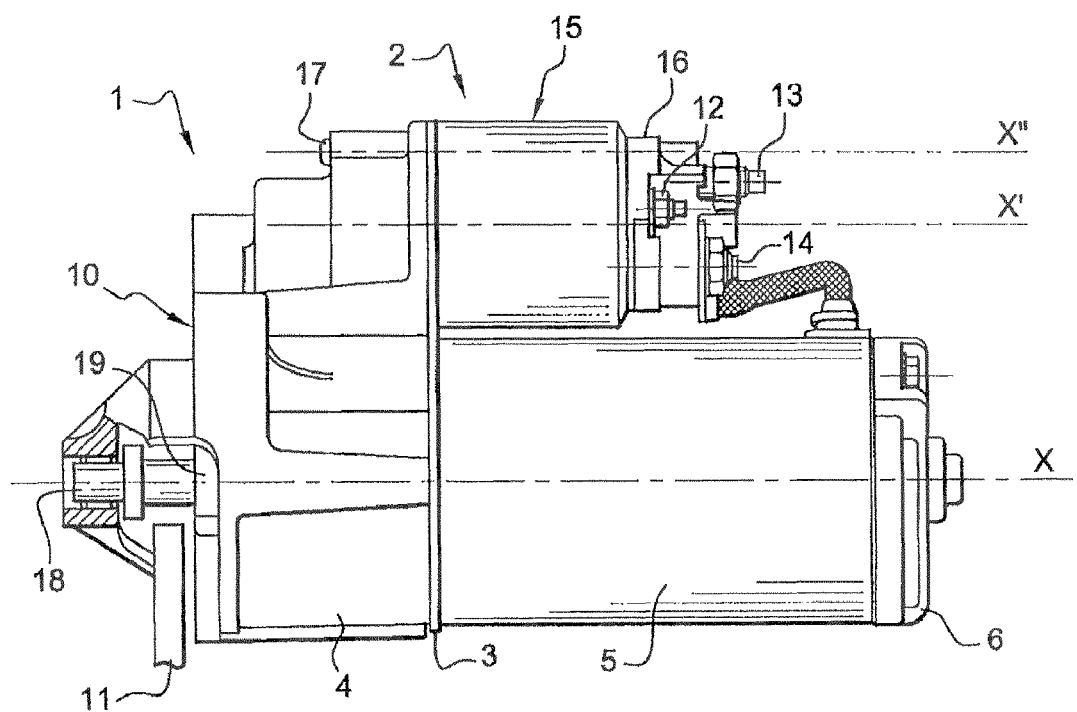
FIG. 1 is a lateral view of the starter with partial cutaway in order to present the pinion and the toothed starting ring of the thermal engine.

FIG. 1 depicts a thermal engine starter 1.

In the remainder of the description, an axial orientation X-X from front to rear will be used, which corresponds to an orientation from left to right looking at FIG. 1.

This FIG. 1 depicts the electromagnetic contactor 2 mounted, according to the invention, on a starter casing 10 comprising a front support 4, configured so as to be fixed to a fixed part such as the crankcase of a motor vehicle thermal engine, a chamber 5 inside which there are housed the components of the electric motor of the starter, in particular the stator, the rotor and the rotor shaft. The casing 10 also comprises a rear bearing 6 configured so as to serve as a bearing at the rear end of the shaft of the rotor of the electric motor.

There can also be seen, in this figure, the pinion 19 of the starter head, part of the toothed starting ring 11 of the thermal engine to be started, and the output shaft 18 of the starter.

The thermal engine starter 1 has an electromagnetic contactor 2 for controlling the thermal engine starter 1. This electromagnetic contactor 2 comprises an enclosure 15 intended to be fixed to the front support 4 by means of at least one fixing member or screw 17, only one of which is shown. This at least one fixing member 17 advantageously comprises a head connected to a threaded body, also referred to as a threaded rod.

The electromagnetic contactor 2 is here situated on the top part of the thermal engine starter 1 and its axis X' is substantially parallel to the axis X of the output shaft 18. In a variant, the electromagnetic contactor 2 can be offset by being fixed to the rear bearing 6 of the electric motor. In this case, the rear bearing constitutes the support of the electromagnetic contactor 2 and the axis of this electromagnetic contactor 2 is then substantially perpendicular to the axis of the rotor of the electric motor, here merged with the axis of the output shaft 18.

The thermal engine starter 1 has, in the aforementioned manner, an enclosure 15 to which there is fixed, at the rear, a cap 16 receiving electrical terminals, namely a first terminal 13 intended to be connected to the vehicle battery, a second terminal 14 intended to be connected to the electric motor, and a third terminal 12 for supplying the electromagnetic coil of the electromagnetic contactor 2 mounted inside the enclosure 15. The cap 16 can be fixed to the enclosure 15 by crimping, screwing or the like. The cap 16 is preferably made from electrically insulating material.

The terminals 12 to 14 are axially oriented with respect to the axis X'. In a variant, at least one of the terminals 12 or 14 is radially oriented.

In another variant, at least one of the terminals 12 or 14 is fixed directly to the enclosure 15.

The cap 16 has here a substantially cylindrical shape.

Figure 4:
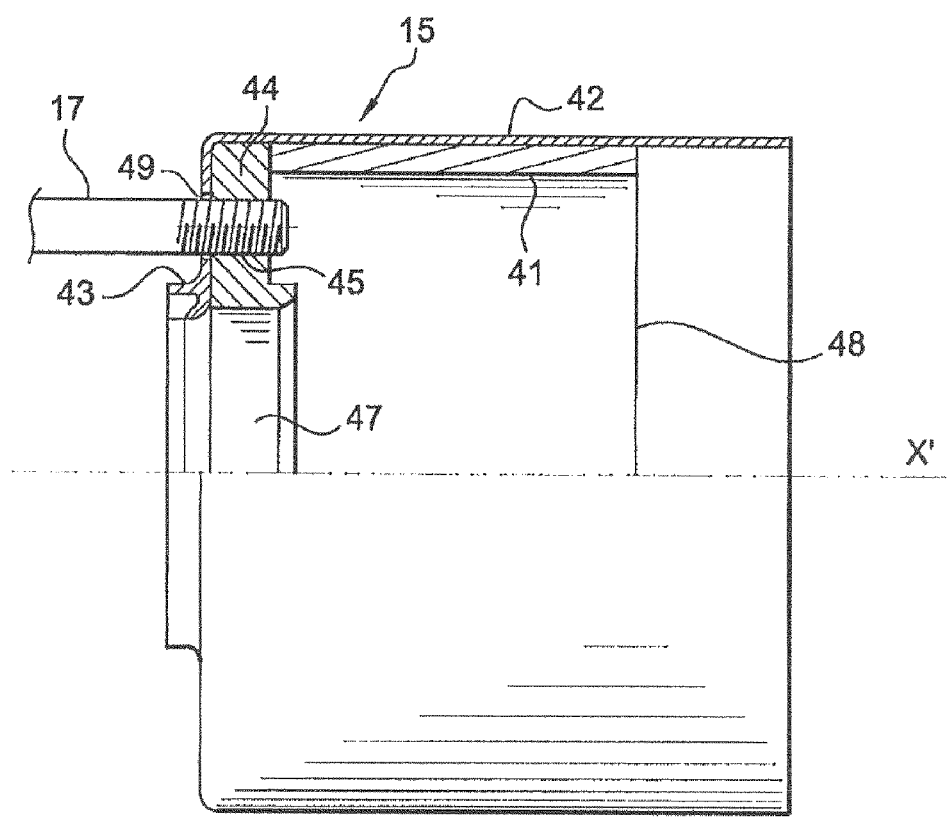
FIG. 4 is a view in section of the contactor receiving a screw for fixing it to the support.

FIG. 4 is a view in section of the electromagnetic contactor 2. An example of an enclosure 15 comprising at least one fixing hole 45 has been shown.

The enclosure 15 is here in three parts. It comprises a bottom 44 oriented transversely to the axis X' and having the threaded at least one fixing hole 45 as well as an orifice 47, for a moving core to pass, centered on the axis X'.

The enclosure 15 also comprises an envelope 42 fixed to the bottom 44 and having an axially oriented part extending in the opposite direction to the bottom 44. The envelope 42 also comprises a part covering the front external part of the bottom 44 and terminating in a centering orifice for the enclosure 15. The centering orifice is composed of protrusions 43. This orifice is in addition coaxial with the orifice 47 for the moving core to pass. The part of the envelope 42 covering the external part of the bottom 44 also has at least one orifice 49 coaxial with the at least one fixing hole 45. The orifice 49 has here a diameter greater than the at least one fixing hole 45. The envelope 42 has in advance been subjected to a surface treatment for resisting corrosion and for conferring on it an aesthetic appearance.

Finally, the enclosure 15 also comprises a ferule 41, tubular in shape, axially oriented, housed inside the envelope 42. The envelope 42 projects axially with respect to the ferule 41. This ferule 41 has a shoulder 48 for the axial abutment of the fixed core (not shown). It also provides an electromagnetic connection between the bottom 44 and the fixed core.

The thicknesses of the bottom 44 and of the ferule 41 are determined according to the requirements of the passage of magnetic flux. In practice, in order to avoid an excessively high consumption of current and an excessively large volume of copper with regard to the winding of the electromagnetic coil, it is necessary not to excessively saturate the magnetic surface, and therefore to have a cross-section of flow for the magnetic flux that is sufficiently large.

In a variant, the enclosure 15 can be produced in a single part, by stamping, casting, forging, sintering or the like.

During its service life, the thermal engine starter 1 is subjected to splashing of water or dust. Any lack of seal at the electromagnetic contactor 2 may then give rise to faulty functioning of the assembly, for example by oxidation of certain elements in the electromagnetic contactor 2.

The lack of seal may take place at several points. The water and dust infiltrate in particular at the terminals 12 and 13 of the electromagnetic contactor 2. It is thus possible to provide a method for achieving a seal between the terminals 12 and 13 and the cap 16, for example as disclosed in the document of the prior art.

The infiltration takes place also at the interface between the cap 16 and the enclosure 15. It is thus possible to provide the seal by improving the crimping of the two pieces.

In order to prevent infiltration between the enclosure 15 and the front support 4, it is possible to provide the seal by the presence of a base plate 3 (FIG. 1), or in a variant the seal can be effected by a seal of the elastomer or paper type.

The applicant perceived that infiltration also takes place between the under-head surface of the at least one fixing member 17, with its axis X" substantially parallel to the axis X, and the opening of the bore belonging to the front support 4 and receiving the at least one fixing member 17. This phenomenon is all the more important since the head may at this level be subject to high mechanical, vibratory and thermal stresses. The at least one fixing member 17 can for example be a screw comprising a head connected to a partly threaded body.

However, the arrangement of two surfaces pressed against each other generally results in only a relative impermeability. This is because the surfaces comprise defects that are sources of leaks.

The invention then aims to limit the effect of these defects.

Figure 2:
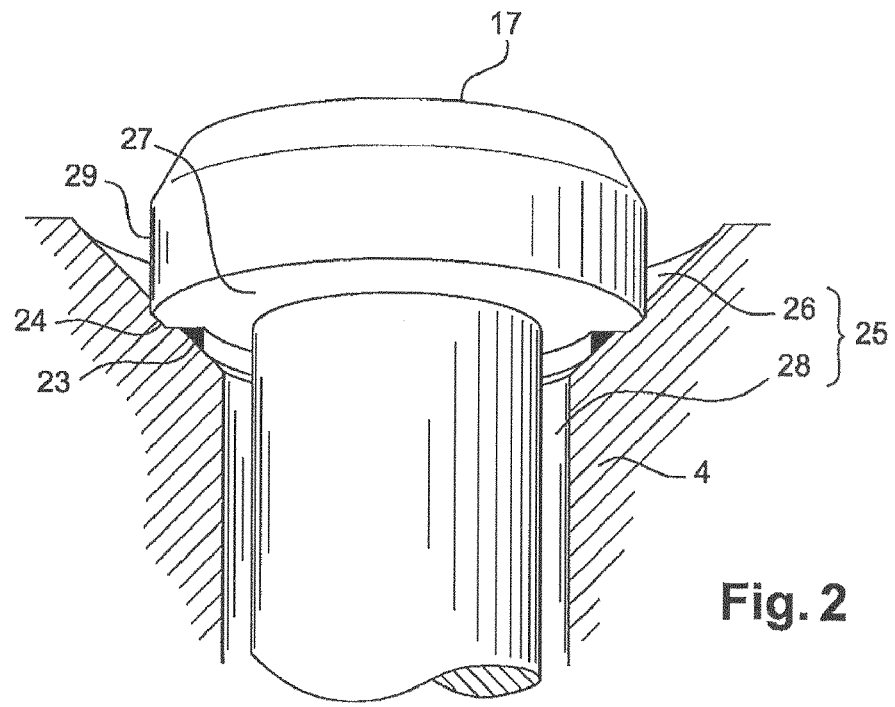
FIG. 2 is a view in section presenting the screw in the bore of the support.

For this purpose, FIG. 2 presents a screw 17, engaged in a bore 25 belonging to a front support 4. The bore 25 is formed for example by means of a chimney. It comprises a passage part 28 for the screw 17 and an opening 26 corresponding to the intermediate surface between the passage part 28 and the external surface of the front support 4. The passage part 28 may have a square, rectangular, oval or polygonal cross-section. FIG. 2 presents a cross-section of the round passage part 28 with a diameter greater than the diameter of the screw body.

The front support 4 can be a molded support. The opening belonging to the front support 4 is then formed for example by molding or broaching.

The screw 17 is a standard screw consisting of a head providing the pressure on the opening 26 of the bore 25. This screw 17 has an under-head surface of revolution and the opening has a splayed shape and thus they offer only a small contact area between them.

In a preferential embodiment presented in FIG. 2, the under-head surface is flat and the opening has a frustoconical shape. Thus the contact area between the screw head and the opening is substantially equal to a circle. The pressure exerted by the head on this area is therefore very high. It thus promotes the penetration of the head into the material of the support and better sealed fitting of the opening on a part of the under-head surface during screwing.

The method for achieving impermeability comprises the following steps. In a first step, the screw 17 will be engaged in the bore 25 so that the head comes into contact with the enlarged opening. In a second step, the screwing of the screw 17 into the at least one fixing hole 45 takes place so that the pressure exerted by the head causes a sealed fitting of the opening on a part of the under-head surface of the screw.

This is because the screw 17 has a body provided with a threaded part screwed into at least one fixing hole 45 belonging to the enclosure. In this way the enclosure is assembled with the support. The at least one fixing hole 45 is threaded before the screw 17 enters therein. In a variant, the screw 17 is self-tapping and provides the creation of the thread in the at least one fixing hole 45. In another variant, the at least one fixing hole 45 formed in the enclosure may not be threaded and the body of the screw 17 is screwed into a nut attached for example to the bottom 44. The nut can be fixed to the bottom 44 for example by welding or may be free.

In this way impermeability, without any additional piece, is achieved between non-smooth surfaces.

During the assembly of the screw 17, the head is pressed into the material of the support. The screw 17 effects a translation movement combined with a rotation movement with respect to the support. The support having a lower mechanical strength than the screw 17, the head will penetrate the material and the defects in the opening will be attenuated by the friction of part of the under-head surface of the screw 17 with the opening.

Thus, the sealed fitting of the opening on part of the surface under the head of the screw 17 is achieved by attenuation of the defects in the material of the front support 4 and by deformation of this material in the defects of the under-head surface of the screw 17.

The pressure exerted by the head causes, by rubbing and pushing back a part of the material, the creation of the surface 31 on the opening. At the same time, this pressing in causes the caulking of part of the material of the front support 4 under the head and the formation in this way of a rim 23 coming to be pressed against the under-head surface of the screw 17 in order to constitute the surface 32. The under-head surface guides the rim 23 during its formation.

Preferably, the impermeability is not achieved by contact between the rim 23 of material and the body of the screw 17 because of the depth of the opening.

In order to achieve the sealed fitting of the opening on part of the under-head surface, it is necessary for the front support 4 to have a lower mechanical strength than the screw 17. The choice of materials is therefore important. If the difference in mechanical strength between the screw 17 and the support is too small, the head of the screw 17 will not be properly pressed in and risks, during its rotation movement, tearing the material of the front support 4. In addition, if the head is not properly pressed in, the screwing of the threaded part in the at least one fixing hole 45 of the enclosure will not be sufficient to ensure a good fixing of the contactor on the front support 4. Conversely, if this difference is too great, the head will be pressed into the material too greatly. There is then a risk that the body of the screw 17 may come into contact with the electromagnetic coil and consequently interfere with its functioning.

Preferentially, the front support 4 is made from aluminum. This material offers the advantage of being capable of withstanding the various stresses that a starter support may undergo during its use. The screw 17 is made from steel, preferably stainless, which makes it possible to use standard at least one fixing members 17 for fixing the electromagnetic contactor 2 on the thermal engine starter 1. In a variant, the screw 17 is the subject of a surface treatment intended to protect it against corrosion. This treatment can also improve the coefficient of friction of the screw 17. The treatment may for example be a galvanizing creating a fine protective layer. This layer, through its mechanical strength, can also participate in the sealed fitting of the surfaces.

Figure 3:
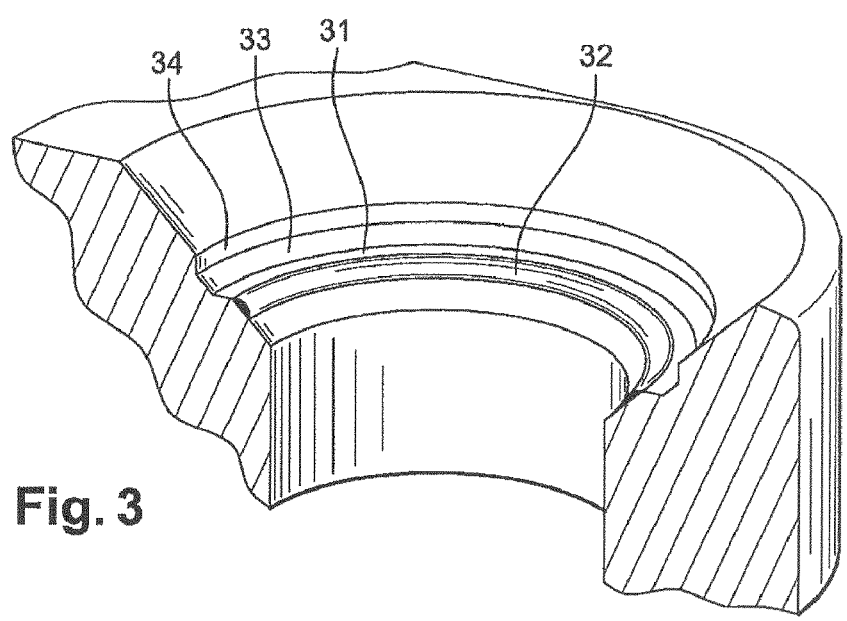
FIG. 3 is a view in section presenting the impression left by the head of the screw on the opening of the bore.

At the end of assembly of the screw 17, an impression of the screw head in the front support 4 is obtained as shown in FIG. 3.

This impression comprises in particular at least two surfaces 31, 32 participating actively in the sealed fitting of the opening on a part of the under-head surface of the screw 17.

The surface 31 extends circumferentially around the axis of revolution of the screw 17. This surface changes as the head sinks into the material of the front support 4.

The surface 32 belonging to the rim 23 extends circumferentially around the axis of revolution of the screw 17, extending the surface 31.

FIG. 3 presents an impression also comprising a surface 33, issuing from the fitting in the support of a bevel 24 providing the connection between the lateral surface 29 of the screw head and the under-head surface 27. In a variant, there may be no bevel, the lateral surface 29 then forming with the under-head surface 27 a substantially perpendicular angle. The impression also comprises a surface 34 issuing from the fitting of the lateral surface 29 in the support. The surfaces 33, 34 participate, but to a lesser extent, in the impermeability between the opening and the support.

Thus the invention makes it possible to achieve a sealed assembly between two metal pieces with non-smooth surfaces, without the use of an additional piece providing this impermeability. The method is therefore simple and economical.

The invention also applies to the mounting of a contactor on a starter casing.

The present invention is not limited to the example embodiments described above.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for producing a sealed assembly between the opening of a bore belonging to a support and a screw comprising a head connected to a body provided with a threaded part intended to cooperate with a hole in a piece to be assembled with the support, the support having a lower mechanical strength than the screw, wherein that, starting from an enlarged opening frustoconical in shape located on the support and a screw head provided with an under-head surface planar of revolution, the method comprises the following steps:

engaging the screw in the bore so that the head comes into contact with the frustoconical-shaped opening of the support;

screwing the screw into the hole in the piece to be assembled so that the pressure exerted by the head causes a sealed fitting of the frustoconical-shaped opening on part of the under-head surface of the screw by attenuation of the defects in the frustoconical-shaped opening due to the friction of part of said under-head surface of the screw with said frustoconical-shaped opening and by pushing back part of the material belonging to the support; and wherein the pressure exerted by the screw head causes, by rubbing and pushing back of material, the creation of a first surface on the frustoconical-shaped opening, extending circumferentially around the axis of revolution of the screw.

2. The method according to claim 1, wherein the pushing back of material creates a rim.

3. The method according to claim 1, wherein the support is made from aluminum and the screw is made from steel.

4. A method for producing a sealed assembly between the opening of a bore belonging to a support and a screw comprising a head connected to a body provided with a threaded part intended to cooperate with a hole in a piece to be assembled with the support, the support having a lower mechanical strength than the screw, wherein that, starting from an enlarged opening frustoconical in shape located on the support and a screw head provided with an under-head surface planar of revolution, the method comprises the following steps:

engaging the screw in the bore so that the head comes into contact with the frustoconical-shaped opening of the support;

screwing the screw into the hole in the piece to be assembled so that the pressure exerted by the head causes a sealed fitting of the frustoconical-shaped opening on part of the under-head surface of the screw by attenuation of the defects in the frustoconical-shaped opening due to the friction of part of said under-head surface of the screw with said frustoconical-shaped opening and by pushing back part of the material belonging to the support;

wherein the pushing back of material creates a rim; and wherein said pushing back of material creates said rim having a second surface pressed against said under-head surface of the screw and wherein the second surface and a first surface extend circumferentially around the axis of revolution of the screw.

5. The method according to claim 4, wherein said screw has a lateral surface forming, with the under-head surface of the screw, a substantially perpendicular angle and wherein the pressure exerted by the head of the screw causes the creation of a surface referred to as the third surface.

6. The method according to claim 5, wherein said screw has a bevel providing the connection between the lateral surface of the head of the screw and the under-head surface of the screw and wherein the pressure exerted by the head of the screw causes the creation of a surface, referred to as the fourth surface.

\* \* \* \* \*